(12) United States Patent
Slots et al.

(10) Patent No.: US 8,549,969 B2
(45) Date of Patent: Oct. 8, 2013

(54) SUPPLY DEVICE FOR CUTTING DEVICE

(75) Inventors: Antonie Slots, Heeten (NL); Martinus Regterschot, Wapenveld (NL)

(73) Assignee: VMI EPE Holland B.V., Rk Epe (NL)

( * ) Notice: Subject to any disclaimer, the term of this patent is extended or adjusted under 35 U.S.C. 154(b) by 950 days.

(21) Appl. No.: 11/990,590

(22) PCT Filed: Aug. 31, 2006

(86) PCT No.: PCT/NL2006/000441
§ 371 (c)(1),
(2), (4) Date: Jul. 9, 2010

(87) PCT Pub. No.: WO2007/027088
PCT Pub. Date: Mar. 8, 2007

(65) Prior Publication Data
US 2010/0264189 A1    Oct. 21, 2010

(30) Foreign Application Priority Data
Sep. 2, 2005   (NL) ...................................... 1029863

(51) Int. Cl.
*B65H 35/00*    (2006.01)
(52) U.S. Cl.
USPC ............................................. 83/401; 83/409
(58) Field of Classification Search
USPC ................... 83/401, 409; 152/526, 534–540; 269/55–85
See application file for complete search history.

(56) References Cited

U.S. PATENT DOCUMENTS

| | | | | |
|---|---|---|---|---|
| 2,767,823 A | * | 10/1956 | Beamish | ........................ 198/619 |
| 3,616,978 A | * | 11/1971 | Haslam | ........................... 226/93 |
| 3,662,635 A | * | 5/1972 | Yabuta | ............................... 83/23 |
| 7,694,800 B2 | * | 4/2010 | Verroeye | ........................ 198/401 |
| 2005/0000626 A1 | | 1/2005 | Auclair | |

FOREIGN PATENT DOCUMENTS

| | | |
|---|---|---|
| DE | 1 255 919 | 12/1967 |
| DE | 1 260 131 | 2/1968 |
| DE | 27 12 606 | 9/1977 |
| DE | 27 07 917 | 8/1978 |
| DE | 195 02 868 | 8/1995 |
| DE | 195 02 850 | 9/1995 |
| DE | 102 01 368 | 5/2003 |
| EP | 1 065 043 | 1/2001 |

(Continued)

OTHER PUBLICATIONS

Espacenet English abstract of JP 7-100956 A.

(Continued)

*Primary Examiner* — Sean Michalski
(74) *Attorney, Agent, or Firm* — Ladas & Parry LLP

(57) ABSTRACT

Supply device (1) for a cutting device (2) for a web of reinforced rubber material, comprising a first and a second web transporter provided with web engagers, wherein the first and second web transporters are spaced apart from each other in web direction and are attached to a first and a second carriage that are connected to each other for being reciprocally moved as one unity, o attached to a common reciprocally movable carriage (23), respectively, wherein the first web transporter is situated downstream from the second web transporter, wherein the supply device furthermore comprises guides for guiding the carriage (s) with both transporters during the reciprocal motion, wherein the guides for the carriage or carriages with both transporters are continuous for the entire stroke of the reciprocal motion.

6 Claims, 10 Drawing Sheets

(56) References Cited

FOREIGN PATENT DOCUMENTS

| | | |
|---|---|---|
| EP | 1 243 404 | 9/2002 |
| EP | 1 286 903 | 3/2003 |
| EP | 1 329 405 | 7/2003 |
| EP | 1 447 210 | 8/2004 |
| GB | 1 268 134 | 3/1972 |
| JP | 58-89294 A | 5/1983 |
| JP | 61-44598 A | 3/1986 |
| JP | 63-230462 A | 9/1988 |
| JP | 7-100956 A | 4/1995 |
| JP | 7-214695 A | 8/1995 |
| JP | 2001-9929 A | 1/2001 |

OTHER PUBLICATIONS

Espacenet English abstract of JP 7-214695 A.
Espacenet English abstract of JP 2001-9929 A.
Espacenet English abstract of JP 63-230462 A.

* cited by examiner

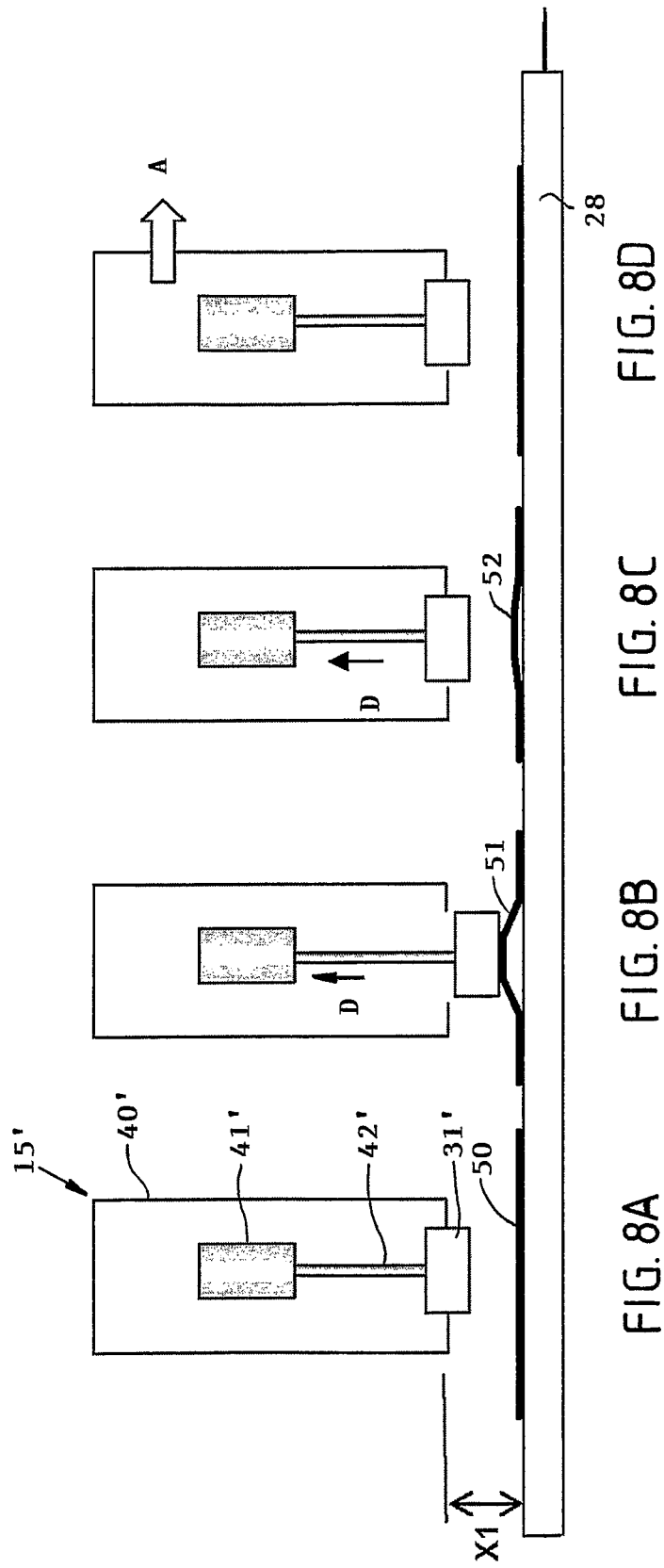

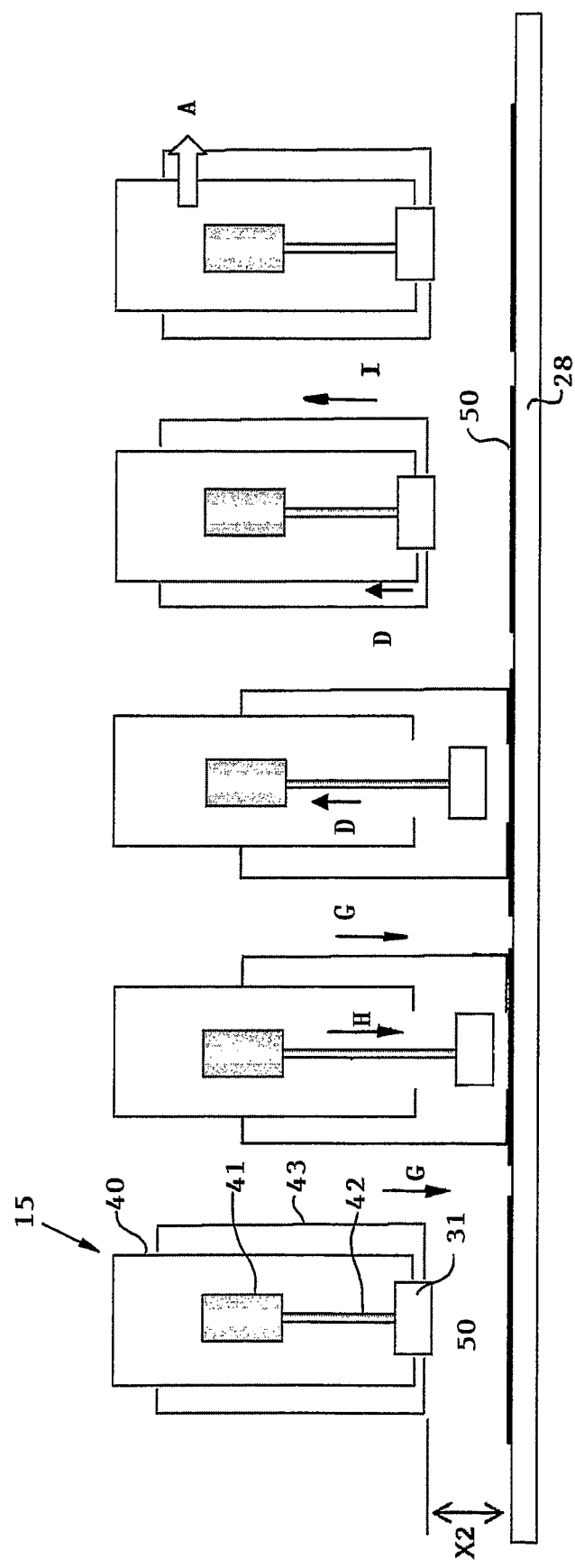

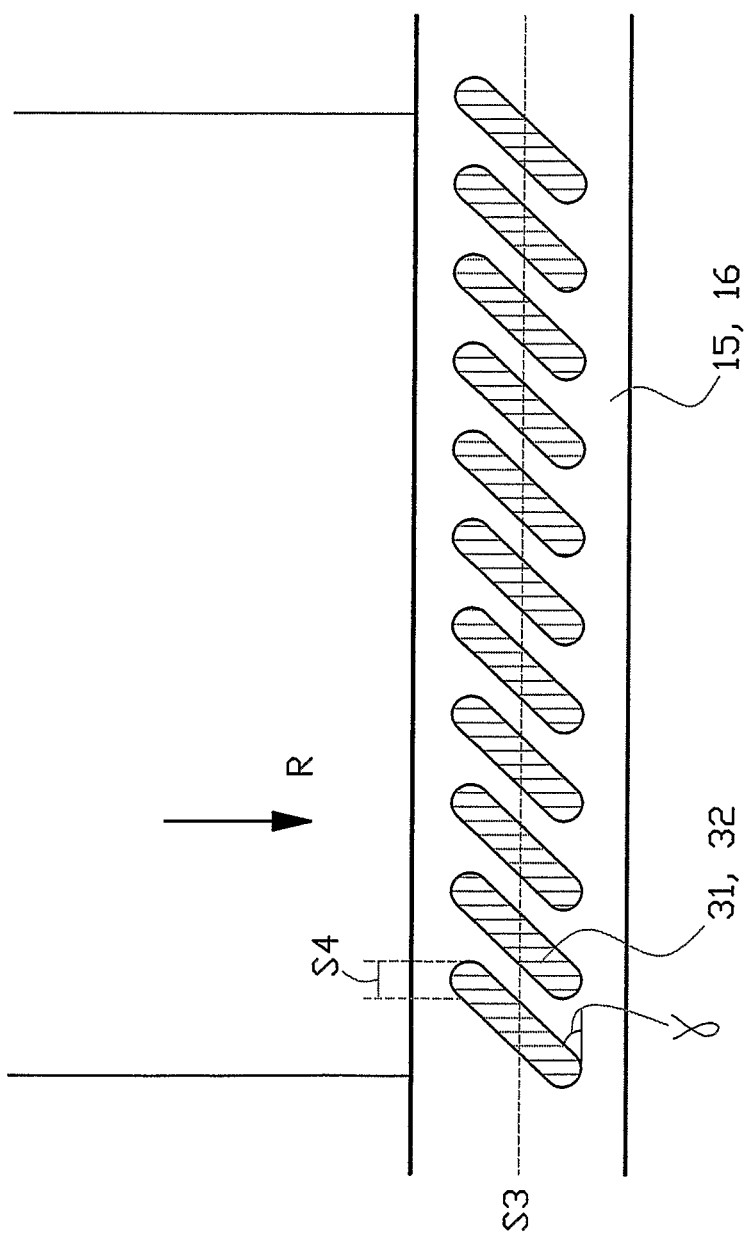

SUPPLY DEVICE FOR CUTTING DEVICE

The invention relates to a supply device for a cutting device for web-shaped material to be used in building tyres.

Such a supply device together with the cutting device is part of a so-called breaker-cutter system, wherein furthermore may be incorporated a unwinding trestle for the web of material, a discharger for pieces of web that have been cut off, a splicer for splicing the pieces of web together and a winding trestle for the new composite web.

The material of the web usually is unvulcanised rubber having steel cords running in longitudinal direction of the web for reinforcement. The web is supplied to the cutting device at an angle of 15-90 degrees and successively cut there in parallelogram-shaped pieces. Said pieces are discharged in a direction parallel to the cutting line, and spliced together on the splicer at the uncut sides. A new web is thus obtained, in which the steel cords are at an angle to the main direction of the web.

The supply device stepwise, discontinuously supplies the initial web to the cutting device, wherein the supply length and the supply angle can be set. Supply speed, accuracy and the material retaining its shape are of great importance here. Each deviation in the web to be made may have large consequences for the soundness of the tyre to be made and thus for the safety.

Generally known is a supply device having a roller track supporting the web and two magnet beams positioned above the roller track, an upstream magnet beam transverse to the initial web and a slanted magnet beam, situated between the former magnet beam and the cutting device. Both magnet beams are reciprocally movable on their own pair of guides. At the downstream end the guides for the slanted magnet beam have been attached to a plate positioned in front of/above the blade of the cutting device. The slanted magnet beam is suspended from two sleeves that can be moved over the guides. Both magnet beams are coupled to each other by means of a single coupling rod. In the middle of the supply device there is a ring, on which a transverse beam is attached. Said transverse beam together with the two guides and the slanted magnet beam forms a parallelogram structure. When swinging the entire supply device said parallelogram deforms along of its own accord. The downstream magnet beam then always assumes a more or less correct slanted position. The forces of inertia are a problem in case of higher speeds. In the many junctions, particularly the four junctions/points of rotation an increasing play arises. The (complex) parallelogram is prone to internal deformation. As a result this machine is in fact no longer able to comply with the current high demands on accuracy.

Another embodiment is described in European patent application 1.286.903. Use is then made of several adjacently placed conveyor belts. The conveyor belts support the web and have been provided with magnets to be able to transport the web along. When swinging the supply device they can be shortened. However, this is a complex structure.

It is an object of the invention to provide a supply device of the type mentioned in the preamble, which provides a higher degree of accuracy.

From one aspect the invention provides a supply device for a cutting device for a web of reinforced rubber material, comprising a first and a second web transporter provided with web engagers, wherein the first and second web transporters are spaced apart from each other in web direction and are attached to a first and a second carriage that are connected to each other for being reciprocally moved as one unity, or attached to a common reciprocally movable carriage, respectively, wherein the first web transporter is situated downstream from the second web transporter, wherein the supply device furthermore comprises guides for guiding the carriage (s) with both transporters during the reciprocal motion, wherein the guides for the carriage or carriages with both transporters are continuous for the entire stroke of the reciprocal motion.

In this way a mutual displacement of both web transporters can be prevented, as a result of which they form one unity as it were and the web is moved by the web transporters with an as small a risk of deformation in its main plane as possible. In this way the shape and orientation of the web discharged to the cutting device becomes reliable.

The web engagers may in case of steel reinforcement cords be active on magnetic force. In case of synthetic reinforcement other types of engagers can be used, such as suction cups.

In one embodiment the guides are situated above the web. The web transporters may extend downward from the guides.

In one embodiment, wherein for each web transporter an own carriage has been provided, a common drive for both carriages is present, as a result of which the mutual placement reliability of both carriages is further increased.

If the drive for the carriage(s) comprises a servomotor the accuracy of the displacement of the web transporters is enhanced. The drive may further comprise a spindle/nut drive.

The first web transporter may be attached to the (first) carriage so as to be set about a vertical centre line, so that the angle in the horizontal plane of the first web transporter with respect to the cutting device can be set directly. Using suitable means, such as retractable/extendable clamping blocks, the set position of the first web transporter can be secured.

From a further aspect the invention provides that the first web transporter comprises a transporter beam and a stiffening frame situated in the horizontal plane, which projects at the side of the transporter beam facing away from the cutting device. This ensures the shape-retaining properties of the web transporter, in the long run as well. The stiffness is enhanced when the stiffening frame has been formed as one unity, preferably from a plate material. The stiffening frame may comprise a strip on which the transporter beam is fixedly attached.

Further increasing the stiffness can be achieved when the stiffening frame comprises an arch.

The stiffening frame may also be used to let the securing means, when present, to engage thereon, to be active thereon.

From a further, possibly independent aspect, the invention provides that the web transporters comprises a transporter beam, in a lower surface of which a series of magnets has been positioned, wherein the magnets can be moved up and down with respect to the web, wherein furthermore restrainers are present for near the magnets, particularly next to the magnets, exerting a pressure force on the web when moving the magnets towards and/or away from the web. In that way it can be largely prevented that the web material moves upwards, and therefore deforms, when the magnets approach the web, and/or that web material moves along with the magnets when the magnets are released from the web, as a result of which otherwise the web would be locally permanently deformed (elevations), resulting in inaccuracies in the final product.

In a simple embodiment the restrainers are supported on the transporter beam so as to be movable up and down, and are positioned for movement against the web at or before the magnets engaging the web, and/or for movement away from the web after a period after the magnets have been moved away from the web.

The release process between the magnets and the web material is enhanced when the restrainers are situated on several sides of the magnets in question, preferably at least situated on two opposite sides of the magnets in question, preferably extending around the circumference of the magnets, preferably with slight play.

From a further aspect the invention provides that one or both web transporters comprise a transporter beam, in a lower surface of which a series of (permanent) magnets has been positioned, wherein the magnets have elongated magnet surfaces, and have been accommodated in a transporter beam in a parallel manner, wherein the magnets are at an inclined angle to the beam main direction. In this way the in comparison with round magnets larger force is profited from, whereas moreover it can be easily ensured that all steel cords are tightened over the full width of the web. This is enhanced when the magnets, considered in projection transverse to the beam main direction, overlap each other.

From a further aspect according to the invention a supply device according to the invention is provided, including cutting device wherein the guides have been arranged on an upper frame, which at the location of a central hinge is attached to the cutting device so as to hinge about a vertical centre line, at a location above the movement path of the first web transporter. The central hinge forms a hinge about which the supply device can be rotated with respect to the cutting device in order to set the angle (in the horizontal plane) of the supply device to the blade. In this way, in comparison with the known parallelogram structure, a simple hinge connection is obtained between the supply device and the cutting device, wherein the first web transporter can be brought close to the blade, as a result of which the placement and shape reliability of the material to be cut is enhanced.

This is optimised when the first web transporter is movable up to a position abutting the cutting device, particularly when the first web transporter is movable up to a position abutting the blade holder of the movable blade of the cutting device. The further advantage thereof is that the blade holder can be used as an aid for setting the angle position of the first web transporter: the first web transporter can in that case at all times easily be set parallel to the blade.

From a further aspect the invention provides an assembly of cutting device and supply device for it for a web of reinforced rubber material, comprising a first and a second web transporter, wherein the first and second web transporters are spaced apart from each other in web direction and are movable along an upper frame in a direction towards and away from the cutting device, which upper frame at the location of a central hinge is attached to the cutting device so as to hinge about a vertical centre line, at a location above the movement path of the first web transporter, wherein furthermore means are present for setting the angle of the supply device to the cutting device, wherein the first web transporter can be set about a vertical centre line as regards angle to the upper frame.

From a further aspect the invention provides a supply device for a cutting device for a web of reinforced rubber material, comprising a first and a second web transporter, wherein the first and second web transporters are spaced apart from each other in web direction, wherein the first web transporter comprises a transporter beam and a stiffening frame situated in the horizontal plane, which projects at the side of the transporter beam facing away from the cutting device.

If the stiffening frame comprises an arch, the arch of the stiffening frame may have a centre situated on the said vertical centre line of the central hinge, in the previous embodiment.

From a further aspect the invention provides a supply device for a cutting device for a web of reinforced rubber material, comprising at least one web transporter, comprising a transporter beam, in a lower surface of which a series of magnets has been positioned, wherein the magnets can be moved up and down with respect to the web, wherein furthermore restrainers are present for near the magnets, particularly next to the magnets, exerting a pressure force on the web when moving the magnets towards and/or away from the web.

From a further aspect the invention provides a supply device for a cutting device for a web of reinforced rubber material, comprising a first and a second web transporter active on magnetic force, wherein the first and second web transporters are spaced apart from each other in web direction, wherein at least one web transporter comprises a transporter beam, in a lower surface of which a series of magnets has been positioned, wherein the magnets have elongated magnet surfaces, and have been accommodated in a transporter beam in a parallel manner, wherein the magnets are at an inclined angle to the beam main direction.

The aspects and measures described and/or shown in the application may where possible also be used individually. Said individual aspects, such as the first web transporter being capable of being set, stiffening the first web transporter, magnet positioning, web restrainer, and other aspects, mentioned in particular in the (sub) claims, may be the subject of divisional patent applications relating thereto.

The invention will be elucidated on the basis of an exemplary embodiment shown in the attached drawings, in which.

FIGS. 8A-D show consecutive user steps with a magnet beam according to the state of the art;

FIGS. 9A-E show consecutive user steps with a magnet beam according to the invention; and FIG. 10 shows a bottom view of a magnet beam.

Figure 1:
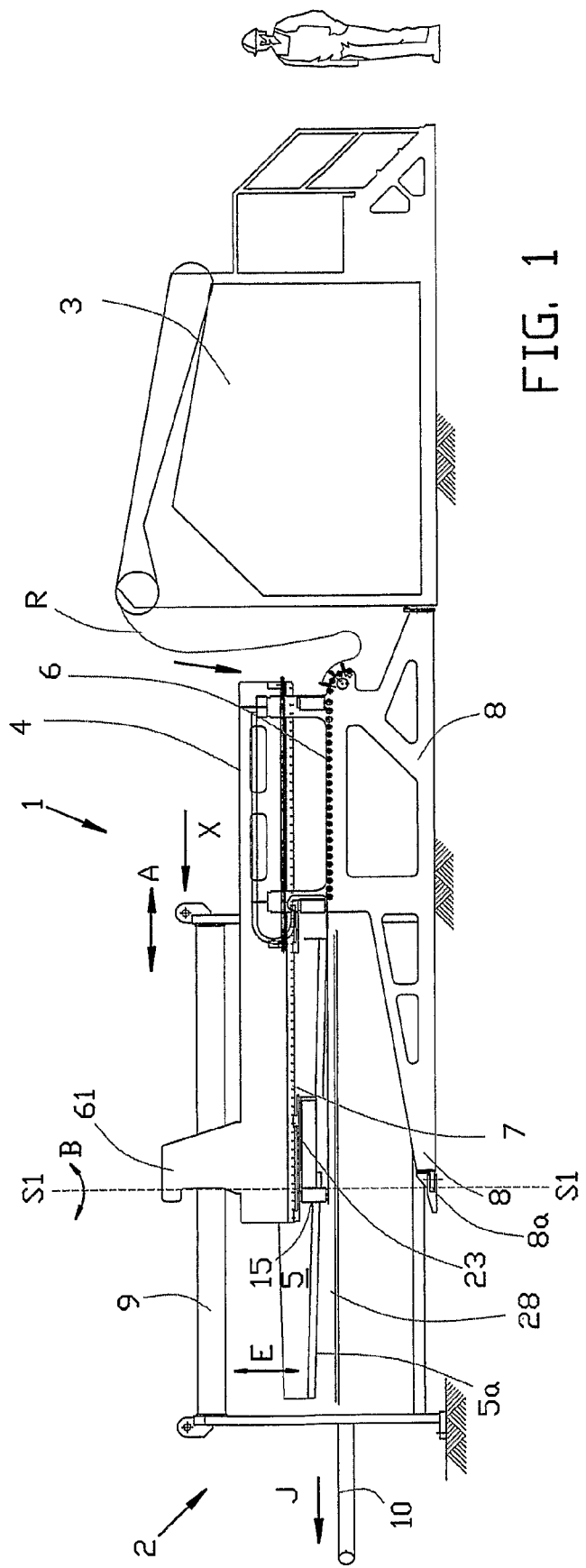
FIG. 1 shows a schematic side view of an exemplary embodiment of a device according to the invention.
Figure 2:
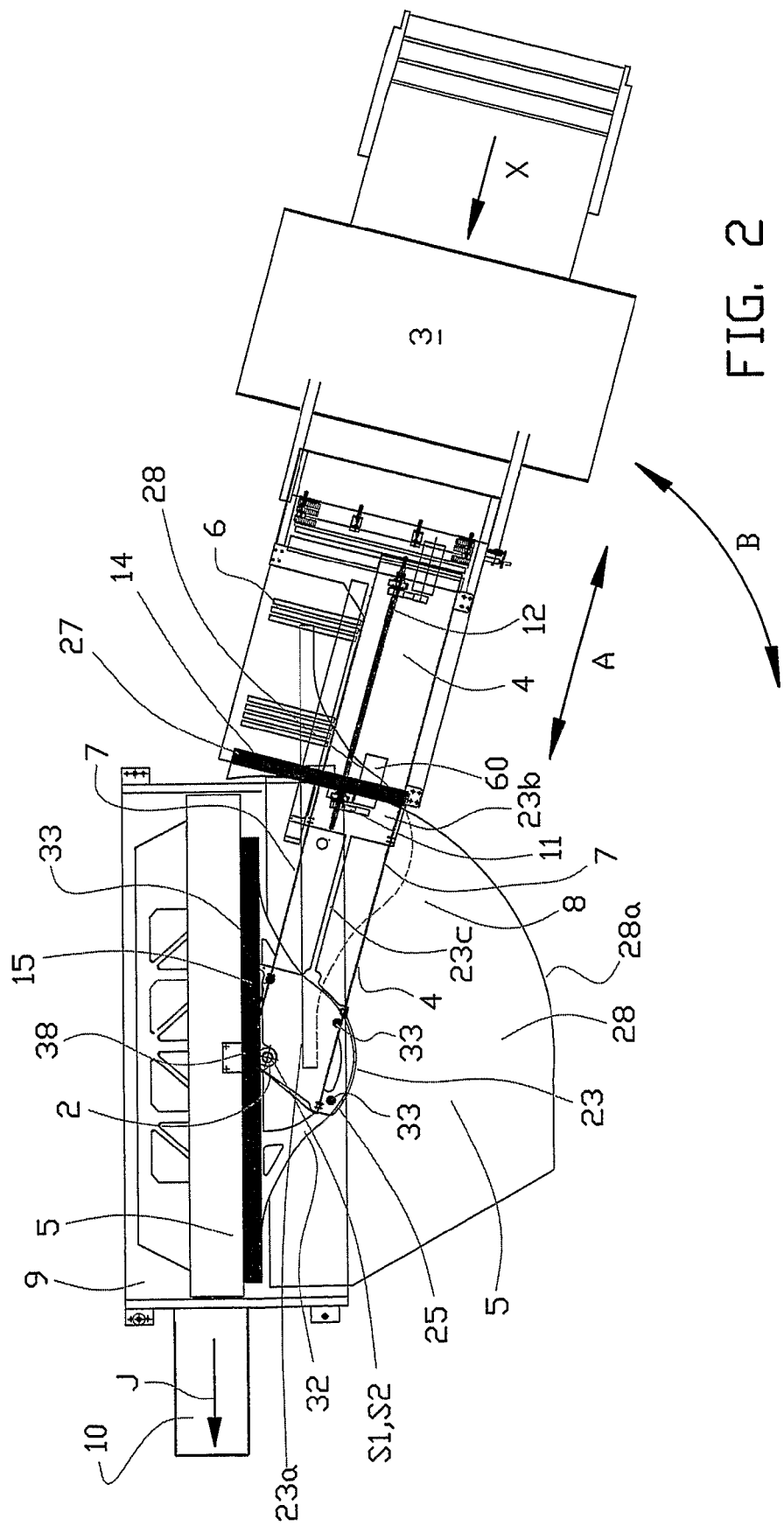
FIG. 2 shows a schematic top view of the arrangement according to FIG. 1.

The device 1 shown in FIGS. 1 and 2 is positioned for supply of a strip R of rubber material provided with cords, particularly steel cords, oriented in supply direction X. The supply device 1 supplies the strip of rubber material to a cutting device 2 fixedly positioned downstream therefrom. The cutting device 2 comprises a fixedly positioned frame 9, a blade holder 5 that can be moved up and down (E) and has a blade 5a provided with an inclined blade edge, and a fixedly positioned counter blade that is not shown, as well as a conveyor—that is not shown—situated downstream from the blade holder 5, which conveyor discharges to a discharge conveyor 10 in the direction J, for discharging pieces of rubber material that have been cut, in which the cords are at an angle to the cut edges, in the manner known per se.

Upstream from the blade 5 the cutting device 2 is provided with a permanent table 28 that has been provided with a for the largest part circular edge 28a, having centre S1. In the upper surface the table 28 is provided with holes (not shown) that are connected to a source of compressed air, so that an air cushion carrying the web of rubber material can be created.

At the supply side of the device 1a stock device 3 has been placed, which is provided with a stock roll of rubber material that is not further shown, which material is supplied to the device 1, see the schematically shown web of material R.

The stock device 3 is attached such to the supply device 1 that it can be moved as one unity in the direction B, see FIG. 2, about a hinge joint with cutting device 2, which joint is to be further discussed.

The supply device 1 comprises a lower frame 8 and an upper frame 4, which in a manner that is not shown are fixedly attached to each other. The lower frame 8 is stiff in all directions and carries a roller track 6, also see the top view of FIG. 2. The roller track 6 connects to the substantially circular edge 28a of the table 28.

Figure 3:
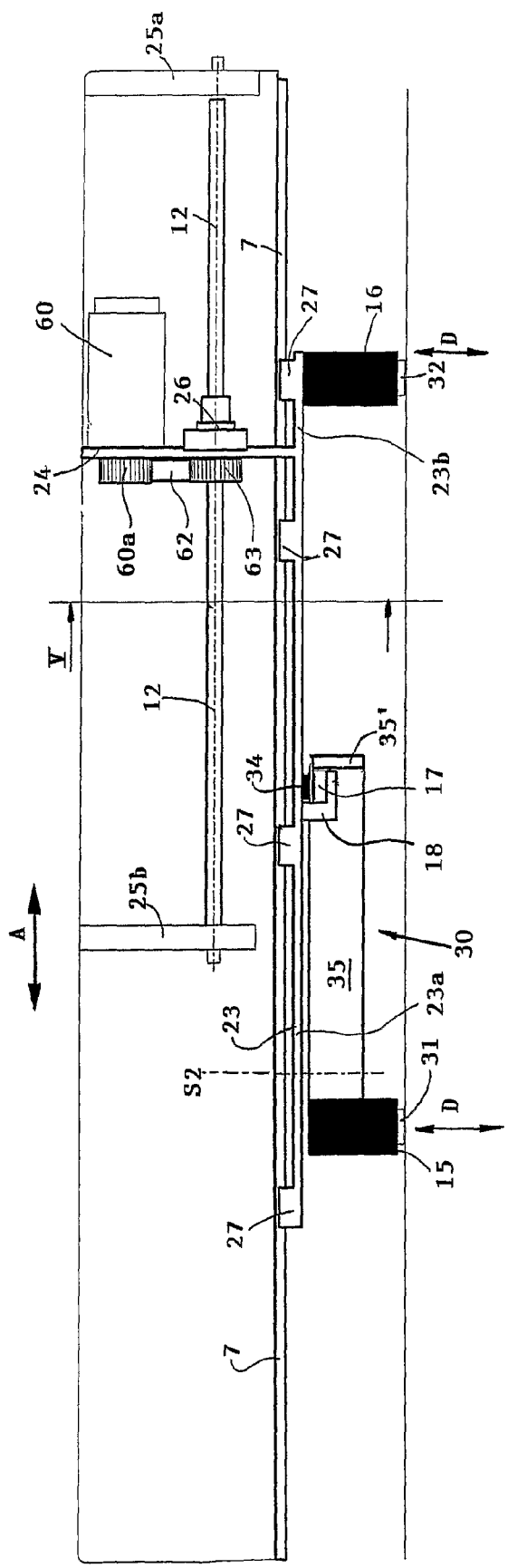
FIG. 3 shows a schematic side view of a possible carriage assembly in the device of FIGS. 1 and 2.
Figure 5:
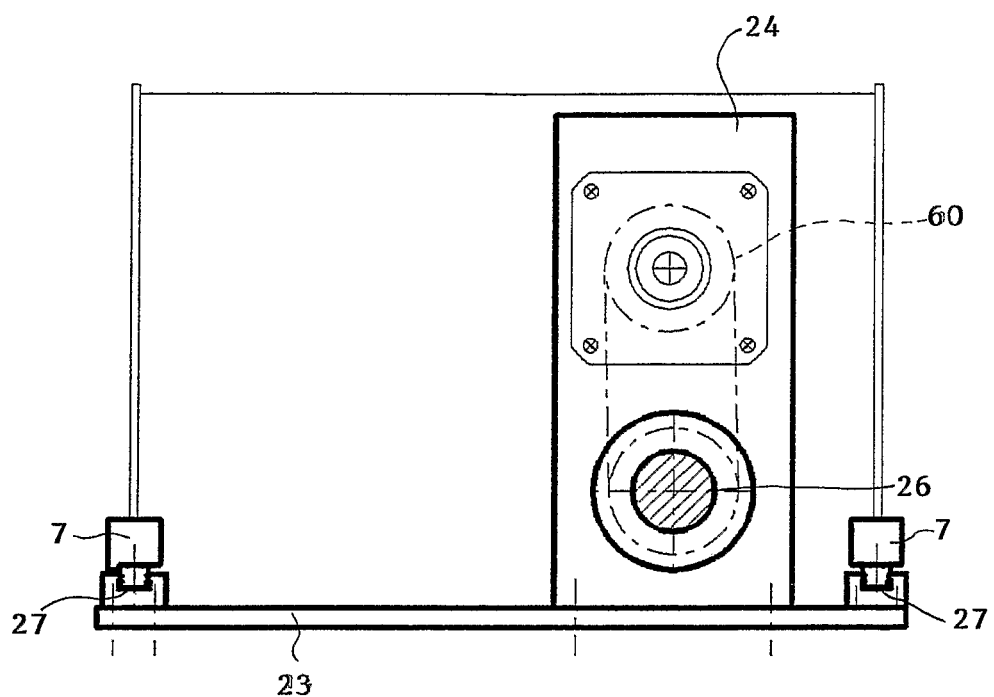
FIG. 5 shows a schematic cross-section according to arrow V in FIG. 3.

The upper frame 4 is stiff in all directions and provided with straight continuous guides 7 (straight guidings), from which is suspended a carriage assembly 23a (front carriage) and 23b (rear carriage), which in a rigid manner are connected to each other by means of connection rod 23c. The carriages 23a, 23b may also be formed as one unity, which embodiment is shown in FIG. 3: in that case the connection rod 23c is not there. The carriages 23a, 23b have been provided with suspension members 27 from which the carriages 23a, 23b have been suspended from the straight guidings 7 for straight, guided movement therealong in the direction A. As can be seen in the FIGS. 3 and 5 an upright plate 24 has been attached to the carriage 23 (or 23b, if there are two carriages 23a,b), which plate 24 serves for mounting a servomotor 60. The servomotor 60 has a toothed wheel 60a driven by it, about which a toothed drive belt 62 runs for driving a toothed drive wheel 63 that directly rotates a nut 26, which nut 26 meshes with a spindle 12, which by means of brackets 25a, 25b is fixedly attached and positioned in the upper frame 4.

Magnet beams 15 and 16 have been attached to the carriage 23 or the carriages 23a, 23b. The magnet beam 16 is fixedly attached to the carriage 23, 23b at the rear end or upstream end thereof. The magnet beam 16 extends transverse to the direction of movement A, and has been provided with magnets 32, which with respect to the magnet beam 16 are movable in the direction D.

Figure 4:
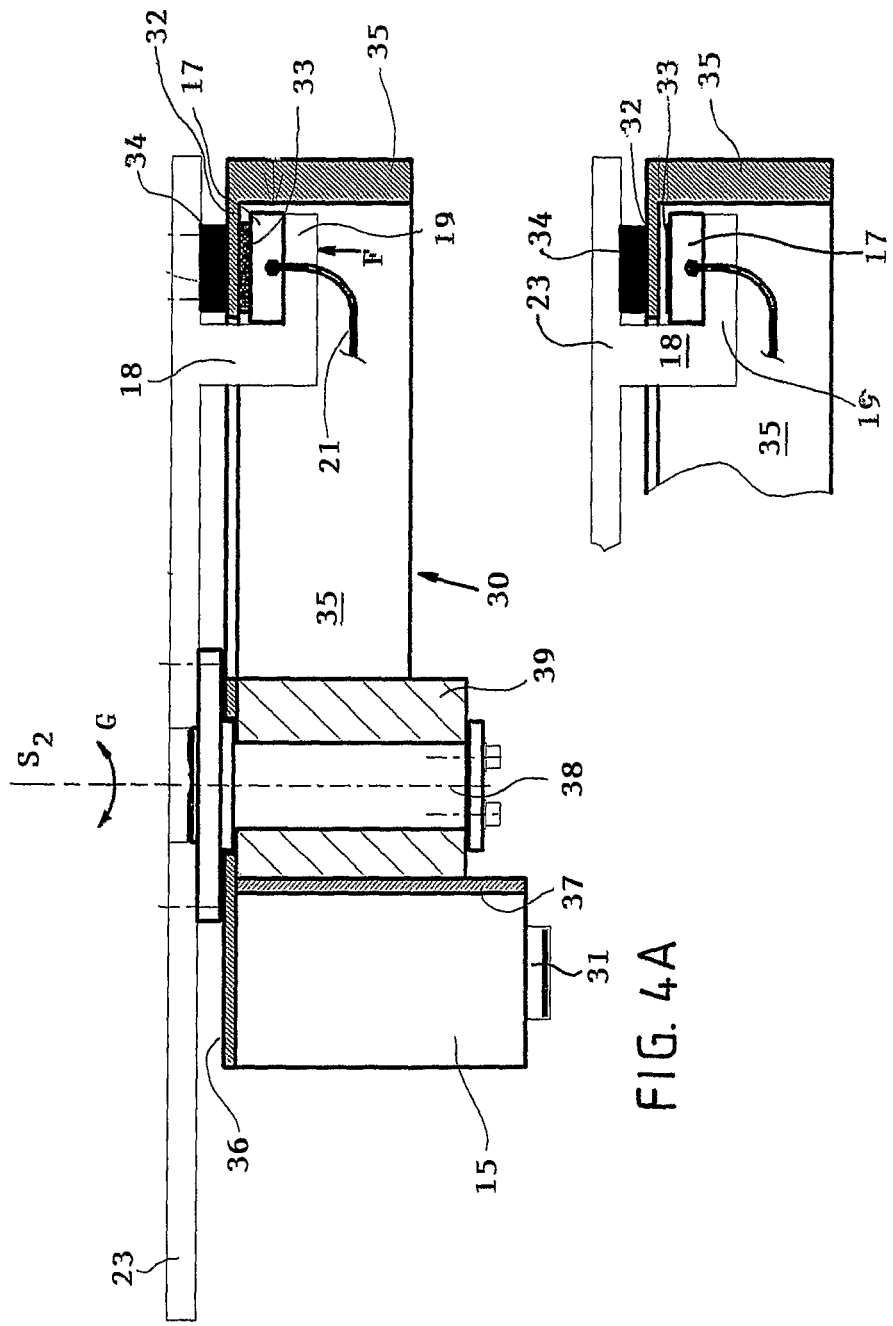
FIGS. 4A and 4B show a schematic view with detail of a rotation and clamping mechanism for the downstream magnet beam in the arrangement according to FIGS. 1 and 2.

The front or downstream magnet beam 15 in angle orientation (as considered in the horizontal plane) is attached to the carriage 23a or 23 so as to be set. The magnet beam 15, as further illustrated in FIGS. 3 and 4A,B, as well as in the top view of FIG. 2, is attached to a frame 30, which is substantially manufactured from one plate, particularly from aluminium, and comprises a longitudinal strip 36, against the lower side of which the magnet beam 15 has been attached in a manner that is not further shown (for instance by means of a number of bolts). Against the lower side of the strip 36 a vertical strip 37 has been attached, which is also attached to the magnet beam 15 and ensures stiffening of the plate 30. The plate 30 furthermore comprises an arched strip 32, at the edge of which, for stiffening, a pending strip 35 has been attached.

Because of the plate 30 with arched strip 32, the magnet beam 15 is stiffened, particularly in the horizontal plane, so that it is able to retain an optimal straightness.

Figure 6:
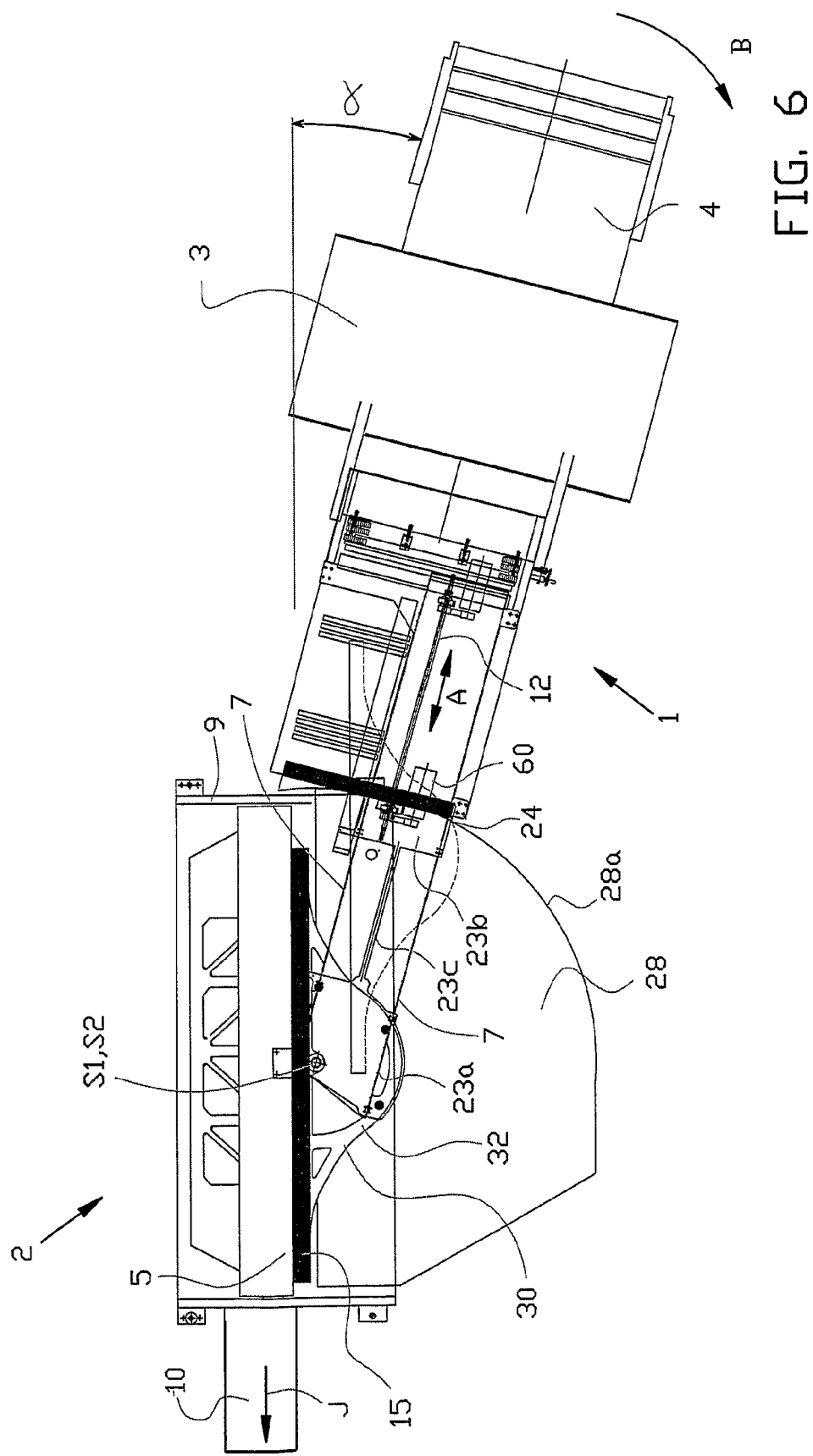
FIGS. 6 and 7 show two angle positions of the device according to FIGS. 1 and 2.
Figure 7:
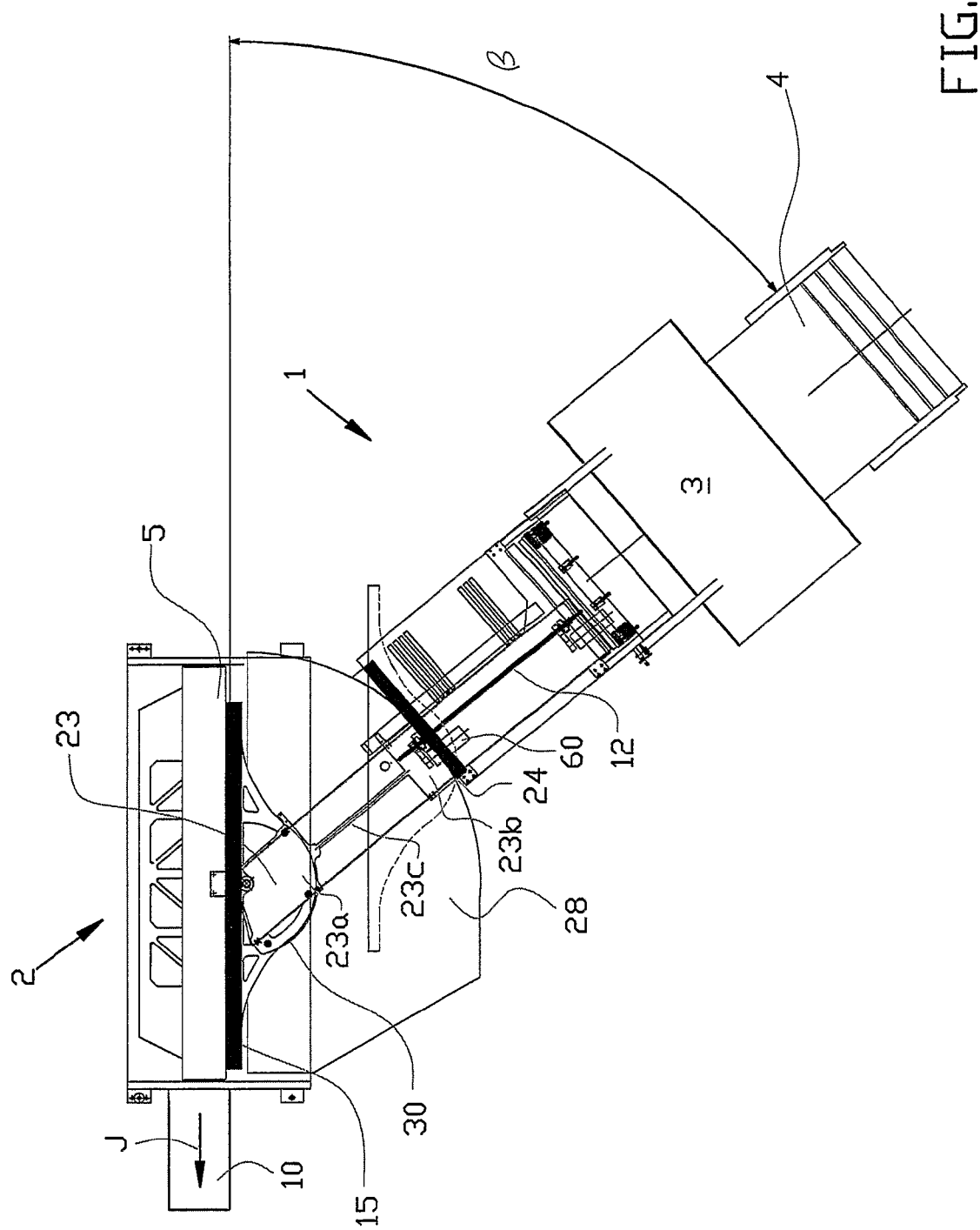

The plate 30 is attached to the carriage 23a, or 23 by means of hinge pin 38 and bearing 39 so as to hinge in the horizontal plane about a centre line S2 in the direction G. A bracket 18 with horizontal part 19, pends down from the carriage 23a or 23, which horizontal part supports pneumatic cylinder 17 that is operable via compressed air line 21. The pneumatic cylinder 17 when operated is able to expand a clamping block 33. Said clamping block 33 is then forcefully pressed against the lower side of the arched strip 32. At the upper side of the arched strip 32 a correspondingly arched brake block strip 34 is attached to the carriage 23 or 23a, which brake block strip 34 is situated opposite the locations where the clamping blocks 33 and related compressed air cylinders 17 have been placed, so that the clamping blocks 33 are capable of pressing the arched strip 32 upwards against the brake block strip 34. Thus by operating the compressed air cylinders 17 the location of the plate 30 with respect to the carriage 23, 23a, considered in direction of rotation G, can be secured. In that way the angle position of the magnet beam 15 is also secured. Note that in FIGS. 2, 6 and 7 it can be seen that the carriage 23a extends sideward beyond the guide 7, the locations of the brake blocks 34/clamping blocks 33 being shown.

The upper frame 4 and the lower frame 8 are attached to the cutting device 2 so as to hinge about a centre line S1 (FIG. 1) at the location of 8a and 61. The straight guidings 7 can extend sufficiently far up to the cutting device 9, so that the magnet beam 15 can be placed up against the cutting device 9. In that position the centre lines S1 and S2 preferably coincide.

It is thus achieved that the magnet beam 15 is able to bring the web of rubber material as close to the blade 5 as possible, as a result of which the risk of undesired deformations is limited.

Due to the magnet beam 15 abutting the cutting device 2, the cutting device 2 forms a reference for the magnet beam 15, which can be used when starting to use the supply device 1. In that way prior to starting to use the supply device 1, the carriage 23 or the carriages 23a, 23b can first be brought in a retracted O-position, which is known, and subsequently the position can be measured in which the magnet beam 15 has been brought against the cutting device 2 by the carriage(s). With these two known positions the exact stroke can be calculated (using a calculation program incorporated in the control unit of the supply device 1) that the carriages have to make in each supply stroke, and the servomotor 60 can be controlled accordingly by the control unit.

In case the angle a (FIG. 6) between the supply direction A and the discharge direction J needs to be changed, the carriage 23 is moved to the cutting device 2, until the magnet beam 15 abuts the cutting device 2 again, for instance the blade holder 5. The pneumatic cylinders 17 are then relieved, so that the clamping onto plate 30 is ended. Subsequently, using means that are not shown, the assembly of supply device 1 and stock device 3 is rotated in the direction B, about centre line S1, until the desired angle position (for instance angle (in FIG. 7), is achieved. The pneumatic cylinder(s) 17 are then activated again, so that the new angle position of the magnet beam 15 is secured. The same position is entered in the control unit of the supply device, and in the above-mentioned way used for controlling the servomotor 60.

The continuous, straight guiding 7 for both guides 23a, 23b or carriage 23 as well the securing of the angle position of the magnet beam 15, ensure that the web of rubber material is taken hold of (using the magnets) at locations which during the supply stroke reliably retain their mutual positions.

On the basis of FIGS. 8A-D and 9A-E another particularity of a magnet beam according to the invention will be explained. In the state of the art according to FIGS. 8A-D the magnet beam 15' is provided with a housing 40' in which cylinders 41' have been accommodated, which by means of piston rods 42' at the lower end have been provided with magnets 31'. The rubber material 50 situated on table 28 is schematically shown. FIG. 8A shows the inactive position. The magnet beam 15' is at all times at a height X1 above the bearing surface of the table 28. After the magnet beam 15 has moved the rubber material 50, see FIG. 8B, the magnet 31' will have to be retracted again (D). Due to the magnetic force, however, the rubber material will tend to move along, so that an elevation 51 is formed. (The height X1 should not be taken too large for that reason. A drawback, however, is that the magnet beams may then contact the rubber material in the return stroke.) Finally the tension in the rubber material will overcome the magnetic force, and the material will detach, see FIG. 8C, nonetheless leaving a deformation 52 in the rubber material. FIG. 8D shows that the magnet beam 15' is returned for carrying out a next transportation stroke.

The magnet beam 15 according to the invention shown in FIGS. 9A-E is provided with an additional facility, in the form of a restrainer 43 that is movable up and down with respect to the housing 40. As shown in FIGS. 9A and 9B first the restrainer 43 is moved downward (G), until it contacts the upper surface of the rubber material 50. Subsequently the magnet 31 is moved downward (H). Because the restrainer 43 extends against the rubber material, it is prevented that an elevation already arises in the rubber material 50 when the magnet 31 approaches.

After the transportation stroke has ended, FIG. 9C, first the magnet 31 is pulled upward (D), but the restrainer 43 remains in its place. Subsequently, FIG. 9D, the restrainer 43 is brought upward in the direction I. The result is that the rubber material remains flat.

A further consequence of preventing that rubber material is transported along upward with the magnet, is that the distance X2 of the magnet with respect to the support surface of the table 28 can be taken larger than X1. As a result any interference of the returning magnet beam 15 with the rubber material is prevented.

FIG. 10 shows another special aspect of the magnet beam 15. The longitudinal direction of the magnet beam 15 is in this case shown with S3. It can be seen that the magnets 31 are elongated, and are positioned at an angle $\gamma$ to the line S3. As a result it is possible to bring the consecutive magnets 31 closer together, considered in the direction S3. It is even possible to create an overlap S4. In this way an optimal engagement of the rubber material is possible.

The invention claimed is:

1. Supply device (1) for a cutting device (2) for a web of reinforced rubber material, comprising at least one web transporter, comprising a transporter beam (15), in a lower surface of which a series of magnets (31) has been positioned, wherein the magnets (31) can be moved up and down with respect to the web, wherein furthermore restrainers are present for near the magnets, exerting a pressure force on the web when moving the magnets towards and/or away from the web, characterized in that the restrainers (43) are supported on the transporter beam (15) so as to be movable up and down, and are positioned for movement against the web at or before the magnets (31) engaging the web, and/or for movement away from the web after a period after the magnets (31) have been moved away from the web, wherein the magnets have elongated magnet surfaces, and have been accommodated in a transporter beam in a parallel manner, wherein the magnets are at an inclined angle to the longitudinal direction of the beam, and wherein the magnets, considered in projection transverse to the longitudinal direction of the beam, overlap each other.

2. Supply device according to claim 1, wherein the restrainers are present for next to the magnets exerting a pressure force on the web when moving the magnets towards and/or away from the web.

3. Supply device according to claim 1, wherein the restrainers are situated on several sides of the magnets in question.

4. Supply device according to claim 3, wherein the restrainers are at least situated on two opposite sides of the magnets in question.

5. Supply device according to claim 4, wherein the restrainers are extending around the circumference of the magnets.

6. Supply device according to claim 5, wherein the restrainers are extending around the circumference of the magnets with slight play.

* * * * *